(12) United States Patent
Ishida et al.

(10) Patent No.: US 12,258,731 B2
(45) Date of Patent: Mar. 25, 2025

(54) REMOTE OPERATION SYSTEM

(71) Applicant: KOBELCO CONSTRUCTION MACHINERY CO., LTD., Hiroshima (JP)

(72) Inventors: Daiki Ishida, Hiroshima (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 243 days.

(21) Appl. No.: 17/567,472

(22) Filed: Jan. 3, 2022

(65) Prior Publication Data

US 2022/0298747 A1    Sep. 22, 2022

(30) Foreign Application Priority Data

Mar. 18, 2021 (JP) ................. 2021-044410

(51) Int. Cl.
*H04B 17/318* (2015.01)
*E02F 9/20* (2006.01)
*G05D 1/00* (2006.01)

(52) U.S. Cl.
CPC ........... *E02F 9/205* (2013.01); *G05D 1/0022* (2013.01); *G05D 1/0044* (2013.01); *H04B 17/318* (2015.01)

(58) Field of Classification Search
CPC ........... E02F 9/205; E02F 9/261; E02F 9/267; G05D 1/0022; G05D 1/0044; G05D 2201/0202; G08C 17/02; H04B 17/318
See application file for complete search history.

(56) References Cited

U.S. PATENT DOCUMENTS

| | | | |
|---|---|---|---|
| 2015/0156611 A1* | 6/2015 | Aggarwal | H04W 24/08 455/456.1 |
| 2015/0181374 A1* | 6/2015 | Tsuda | H04W 4/02 455/457 |
| 2017/0099198 A1* | 4/2017 | Bhimavarapu | H04B 17/318 |

(Continued)

FOREIGN PATENT DOCUMENTS

| | | |
|---|---|---|
| EP | 3 779 061 A1 | 2/2021 |
| JP | 2004-128976 A | 4/2004 |

(Continued)

OTHER PUBLICATIONS

Extended European search report dated Aug. 19, 2022 issued in the corresponding EP Patent Application No. 22158532.6.

(Continued)

*Primary Examiner* — Matthew J. Reda
(74) *Attorney, Agent, or Firm* — Carrier, Shende & Associates P.C.; Joseph P. Carrier; Jeffrey T. Gedeon

(57) ABSTRACT

It is possible to notify an operator of a change in radio wave intensity in addition to the radio wave intensity received by a remotely operating vehicle. A radio wave is transmitted to and received from a vehicle to operate the vehicle. A communication device 14 includes a display unit 21 configured to display information, in which the display unit 21 is capable of displaying a first image 22 representing first radio wave intensity which is radio wave intensity of a radio wave being currently received by the vehicle, and a second image 32 representing information on a change in the first radio wave intensity.

6 Claims, 4 Drawing Sheets

(56) References Cited

U.S. PATENT DOCUMENTS

| | | | |
|---|---|---|---|
| 2018/0282970 A1 | 10/2018 | Koga et al. | |
| 2018/0351631 A1* | 12/2018 | Hamabe | G01R 29/0892 |
| 2018/0351789 A1* | 12/2018 | Ohmae | H04B 7/14 |
| 2020/0045568 A1* | 2/2020 | Kwon | H04W 4/40 |
| 2020/0063397 A1 | 2/2020 | Hatake et al. | |
| 2020/0412465 A1* | 12/2020 | Hamabe | H04B 17/3912 |
| 2021/0321223 A1* | 10/2021 | Adachi | G01S 5/14 |
| 2022/0022077 A1* | 1/2022 | Maganti | H04W 24/10 |
| 2022/0026900 A1* | 1/2022 | Ichien | H04W 4/46 |

FOREIGN PATENT DOCUMENTS

| | | |
|---|---|---|
| JP | 2018-093402 A | 6/2018 |
| JP | 2020-200660 A | 12/2020 |

OTHER PUBLICATIONS

Office Action dated Oct. 1, 2024 issued in the corresponding Japanese Patent Application No. 2021-044410 with the English machine translation thereof.

\* cited by examiner

REMOTE OPERATION SYSTEM

BACKGROUND OF THE INVENTION

Field of the Invention

The present invention relates to a remote operation system allowing an operator to operate a work machine remotely from a remote location, and more particularly, to a remote operation system improved to allow an operator to keep track of a communication state of a work machine.

Description of the Related Art

In recent years, as disclosed in Japanese Patent-Open No. 2020-200660, there has been developed a system allowing work to be performed by remotely operating a work machine at a work site. In a remote operation system in Japanese Patent-Open No. 2020-200660, an operator boards and remotely operates a remote control operation device fabricated in the same manner as an operator seat of an actual machine. In the operation device, a large-sized monitor is provided in front of the operator, which allows the operator to obtain the same field of view as when the operator is boarding an actual vehicle, and thereby operate the work machine with a feeling that the operator is boarding the actual vehicle.

However, the operator cannot keep track of a communication state of the remotely operating work machine. When the work machine is moved, the radio wave intensity of the radio wave to be received by the work machine changes depending on a location. Accordingly, when the work machine is moved to a place where a radio wave environment is unstable in a work area in which the work machine is being moved, the communication may be cut off. However, since the operator cannot keep track of the communication state of the work machine, the operator cannot predict the communication cutoff. Consequently, unexpected communication cutoff occurs, resulting in work interruption. Alternatively, the control delay of the work machine, the destabilization of an image to be transmitted from the work machine to the remote operation device operated by the operator, or the like occurs, which causes a delay of the work.

To avoid the above-described interruption and delay of the work, it is desired to provide a unit which allows an operator to keep track of the changing communication state of the work machine while moving and operating the work machine.

The present invention has been made to solve the above-described problems, and has an object to provide a unit which allows an operator to keep track of a communication state of a remotely operating work machine.

SUMMARY OF THE INVENTION

A communication device according to the present invention is a communication device which transmits and receives a radio wave to and from a vehicle to remotely operate the vehicle, the communication device comprising a display device configured to display information, wherein the display device is capable of displaying a first image representing first radio wave intensity which is radio wave intensity of a radio wave being currently received by the vehicle, and a second image representing information on a change in the first radio wave intensity.

DETAILED DESCRIPTION OF THE PREFERRED EMBODIMENTS

Figure 1:
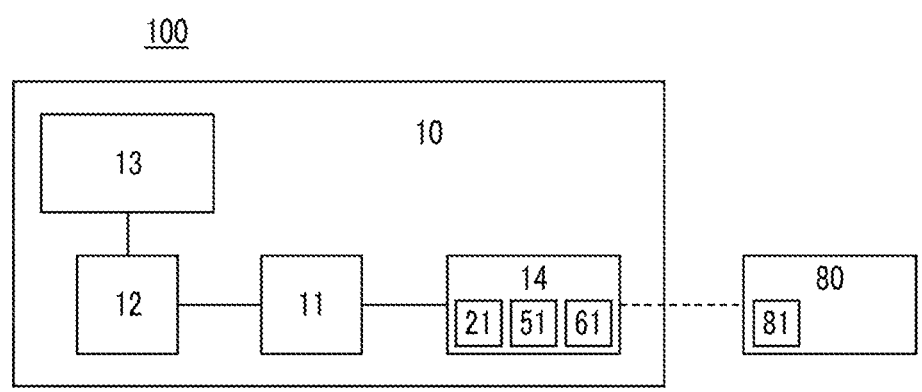
FIG. 1 is a schematic diagram of a remote operation system according to an embodiment of the present invention.

With reference to FIG. 1, description will be made about a remote operation system 100 of an embodiment according to the present invention. The remote operation system 100 includes a remote operation device 10 configured to allow an operator to remotely operate a vehicle, and a transmission and reception device 80 installed in the vehicle at a location away from the remote operation device 10. In the embodiments described below, the vehicle will be described as a work machine which is an example of the vehicle. Examples of the work machine include a power shovel, a crane, a dump truck, or the like. The remote operation system 100 is applicable to vehicles other than the work machine, without limiting the type of the vehicle. For example, the remote operation system 100 is applicable to a passenger vehicle, a bus, a truck, a motorcycle, and the like.

Next, description will be made about the remote operation device 10, and the transmission and reception device 80 mounted on the work machine. The remote operation device 10 includes an arithmetic operation processing device 11, a display processing device 12, a monitor 13, and a communication device 14. Additionally, the remote operation device 10 includes a seat, an operation lever, and switches (which are not illustrated), and the monitor 13 is disposed in front of the seat on which the operator sits. The arithmetic operation processing device 11 has a CPU and a memory (which are not illustrated). The arithmetic operation processing device 11 and the display processing device 12 are connected to each other via a LAN cable, and the arithmetic operation processing device 11 and the communication device 14 are connected to each other via a LAN cable. Additionally, the display processing device 12 and the monitor 13 are connected to each other via an HDMI cable.

The transmission and reception device 80 is provided in the work machine to be remotely operated. A camera (which is not illustrated) configured to capture an image of a front view is attached to the work machine, and an image captured by the camera is transmitted to the remote operation device 10 via the transmission and reception device 80. Transmission and reception are performed between the remote operation device 10 and the transmission and reception device 80 through wireless communication. Types of wireless communication can be appropriately selected, and for example, radio waves in WiFi communication or cellular phone communication are used. The transmitted image is received by the communication device 14 installed in the remote operation device 10, and is displayed on the monitor 13 via the arithmetic operation processing device 11 and the display processing device 12. The operator operates the operation lever and the switches, which are provided in the remote operation device 10, while viewing the image displayed on the monitor 13 in the same manner as when the operator is boarding the work machine. The arithmetic operation processing device 11 detects a type and an operation amount of the device operated by the operator and transmits a control signal to the work machine via the communication device 14.

The control signal is received by the transmission and reception device 80, whereby the work machine is remotely operated. Additionally, the transmission and reception device 80 can recognize the intensity of the received radio wave, and transmits the information on the intensity of the received radio wave to the remote operation device 10 in real time at regular time intervals. The remote operation device 10 stores the transmitted information on the intensity of the received radio wave in a storage unit 61, and displays it on the first image. The information on the intensity of the received radio wave can be received at the regular time intervals, but in the case where the information cannot be received due to decrease in the radio wave intensity, which causes missing of the received information, the radio wave intensity at a missing time at constant time intervals is automatically stored as being less than a predetermined minimum radio wave intensity.

Next, with reference to FIG. 2, description will be made about a first image 22 and a second image 32 which are displayed on the communication device 14. The communication device 14 has a display unit 21 to display, thereon, the information including the radio wave intensity received by the transmission and reception device 80. The display unit 21 is selected from among display devices including a display such as a liquid crystal screen or an organic EL screen, or an LED display device configured by combining a plurality of LEDs. For the display unit 21, a part of a display surface of the monitor 13 may be selected as the display device.

The first image 22 represents first radio wave intensity which is the intensity of the radio wave being currently received by the work machine. The first image 22 includes a first image element 23, a second image element 24, a third image element 25, and a fourth image element 26. The radio wave intensity of the receiving radio wave is classified into four stages in a receivable range from a predetermined minimum radio wave intensity to a predetermined maximum radio wave intensity, and each of the stages are displayed using the first image element 23, the second image element 24, the third image element 25, and the fourth image element 26, respectively. Each of the first image element 23 to the fourth image element 26 is displayed or not displayed depending on each stage.

Each of the first image element 23, the second image element 24, the third image element 25, and the fourth image element 26 is formed in a rectangular shape in which lengths differ slightly from each other. Each of the first image element 23 to the fourth image element 26 includes a first long side 27, a second long side 28, a first short side 29, and a second short side 30, and is disposed in such a way that the longitudinal direction is aligned with the vertical direction in FIG. 2. The first long side 27 is parallel to the second long side 28, and the second long side 28 is formed slightly longer than the first long side 27. The first short side 29 is disposed on a lower end in the horizontal direction, the lower end of the first long side 27 and the lower end of the second long side 28 are superposed on the left end and right end of the first short side 29, respectively, so that the first long side 27 and the second long side 28 are disposed in the vertical direction. Furthermore, on upper sides of the first long side 27 and the second long side 28, the second short side 30 is disposed so that the left end and right end of the second short side 30 are superposed on the upper end of the first long side 27 and the upper end of the second long side 28, respectively. Since the second long side 28 on the right side is formed slightly longer than the first long side 27 on the left side, each second short side 30 is formed to have a rightward rising slope.

Figure 2:
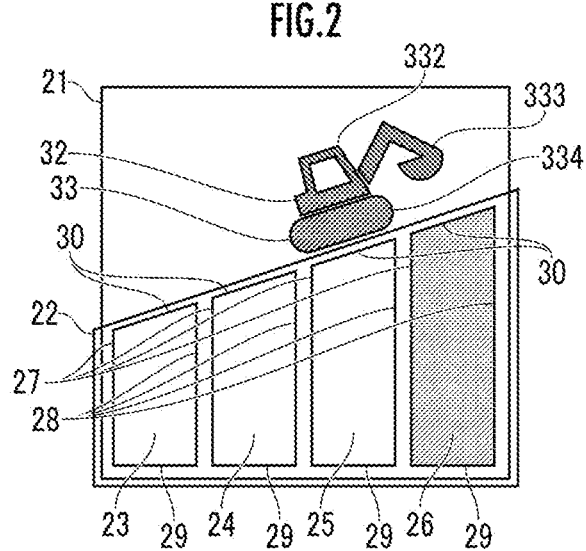
FIG. 2 illustrates a first image and a second image which are displayed on a communication device of FIG. 1.

As illustrated in FIG. 2, each of the first image element 23 to the fourth image element 26 is disposed so that the longitudinal direction is aligned with the vertical direction, and the first image element 23 having the shortest length to the fourth image element 26 having the longest length are disposed adjacently with a constant slight gap therebetween in order from left to right. The first short sides 29 on the lower sides of the respective first to fourth image elements are disposed to be aligned on the same straight line. The second short sides 30 formed each to have a rightward rising slope on the upper sides of the respective first to fourth image elements are disposed to be aligned on the same straight line. The lengths of the first image element 23 to the fourth image element 26 are longer toward the fourth image element 26 at the right end so that the upper end sides of the first image element 23 to the fourth image element 26 are formed each to have a rightward rising slope. Therefore, the first image is configured so that the operator can intuitively recognize, at a glance, that the radio wave intensity is stronger toward the right side.

Only the first image element 23 is displayed in a first stage in which the radio wave intensity is the weakest among the four stages. In a second stage in which the radio wave intensity is slightly stronger than the first stage, the first image element 23 and the second image element 24 are displayed. In a third stage in which the radio wave intensity is slightly stronger than the second stage, the first image element 23, the second image element 24, and the third image element 25 are displayed. In a fourth stage in which the radio wave intensity is further stronger than the third stage, all of the first image element 23 to the fourth image element 26 are displayed. In this way, the first image 22 is configured so that the number of image elements to be displayed increases in proportion of the radio wave intensity, whereby the operator can intuitively recognize the current radio wave intensity at a glance of the first image 22.

In the above description, the radio wave intensity is classified into four stages, but the radio wave intensity may be classified into the number other than four of stages. For example, the number of stages may be two, three, or five. In this case, the number of image elements such as the first image element 23 included in the first image is determined according to the number of stages. In the above example, a configuration has been described in which the radio wave intensity is displayed successively from the first image element 23 meaning the first stage which is the lowest stage to the current stage, e.g., the third image element 25, but only the current stage may be displayed without displaying the stages lower than the current stage. For example, when the current radio wave intensity is in the third stage, only the third image element 25 may be displayed.

The first image element 23 to the fourth image element 26 are formed to have a color different from the background. It is preferable that the color of the first image element 23 and the like is different from the background color to clearly distinguish the first image element 23 and the like from the background. For example, the color of the first image element 23 and the like is white, and the color of the background is black. Alternatively, the colors may be exchanged between the first image element 23 and the like and the background. The colors may be arbitrarily selected among blue, red, yellow, green, gray, and their intermediary colors in addition to white and black.

Alternatively, in addition to having different colors from each other, the same color may be used for the first image element 23 and the like and the background by changing the lightness. Furthermore, the color and lightness may be changed together. Similar to the lightness, the chroma may be changed. Furthermore, the first image element 23 and the like may be formed in a display pattern different from that of the background. For example, one of the first image element 23 and the like and the background is formed in a plain pattern, and the other is formed in a shaded pattern or a dot pattern or the like.

Alternatively, the first image element 23 and the like and the background may be formed to be different from each other by combining the respective colors and patterns.

Alternatively, the first image element 23 to the fourth image element 26 need not be of the same color, and may be of different colors. Alternatively, the first image element 23 to the fourth image element 26 may be different in lightness, chroma, and display pattern. It is only required that the first image element 23 to the fourth image element 26 can be clearly distinguished with respect to the background and from each other. Furthermore, to display a state where the radio wave intensity is weak in the first image, the state can be formed to stand out from the others. For example, only the first image element 23, or only the first image element 23 and the second image element 24 can be represented in red, yellow, or the like. Alternatively, the blinking display may be performed. Note that, each of the first image element 23 to the fourth image element 26 may have a contour line along a part or the whole of the outer shape.

Next, description will be made about the second image 32 representing the information on a change in the radio wave intensity received by the work machine. The radio wave intensity of the radio wave received by the vehicle such as the work machine moving in the travel region varies greatly depending on a distance between the work machine and the antenna, size and presence or absence of a structure existing around the work machine, and presence or absence of a radio wave in a frequency band close to a frequency used by the remote operation device 10. The second image 32 represents a change in first radio wave intensity with respect to second radio wave intensity which is the radio wave intensity at a time point that is a predetermined time before from the current time point. That is, the operator can use the second image 32 to recognize whether the first radio wave intensity which is the radio wave intensity at the current time point is equal to or greater than, or less than that at the time point that is the predetermined time before from the current time point. The second image 32 includes the third image 33 representing the former and the fourth image 34 representing the latter.

The second radio wave intensity at the time point that is the predetermined time before from the current time point is used as a reference for comparison with the first radio wave intensity at the current time point, the predetermined time being initially set. The predetermined time can be arbitrarily set. Alternatively, the predetermined time may be set according to the type of the vehicle. For example, in a work machine moving at a low speed and hardly implying long distance movement, the predetermined time can be set to 10 seconds, 15 seconds, 30 seconds, 45 seconds, one minute, and the like. In a passenger vehicle moving at a high speed and implying long distance movement, the predetermined time can be set to one second, three seconds, five seconds, 10 seconds, and the like.

FIG. 2 illustrates the third image 33 disposed adjacently on the upper side of the first image 22. The third image 33 is representation showing that the first radio wave intensity is equal to or greater than the second radio wave intensity which is the radio wave intensity at the time point that is the predetermined time before from the current time point. The third image 33 is displayed when the display state is changed from the display of only the first image element 23 to the display of the second image element 24 or to the display of the second image element 24 and the third image element 25, or when there is no change in the first image being displayed, for example. The display of the third image 33 means that the radio wave intensity does not change or becomes stronger, and therefore, the operator can recognize that the communication cutoff is unlikely to occur.

The third image 33 illustrated in FIG. 2 is a schematic diagram illustrating a state where a power shovel is climbing a hill. The third image 33 includes a drive part 334 including a crawler, a boarding part 332 disposed on the drive part 331, and an attachment part 333 of the power shovel or the like which is disposed in front of the boarding part 332, and is formed with the front side directed obliquely upward so that the power shovel is climbing an uphill.

Note that, the third image 33 may be of any shape. For example, the third image 33 may be represented with a geometric figure such as an upward triangle, an upward or obliquely upward or rightward arrow, a circle, and a square. The third image 33 may be formed by any of a specific color, a pattern, and both of them. Furthermore, the third image 33 may be displayed by blinking alone, together with a part of the first image, or together with the whole of the first image.

Figure 3:
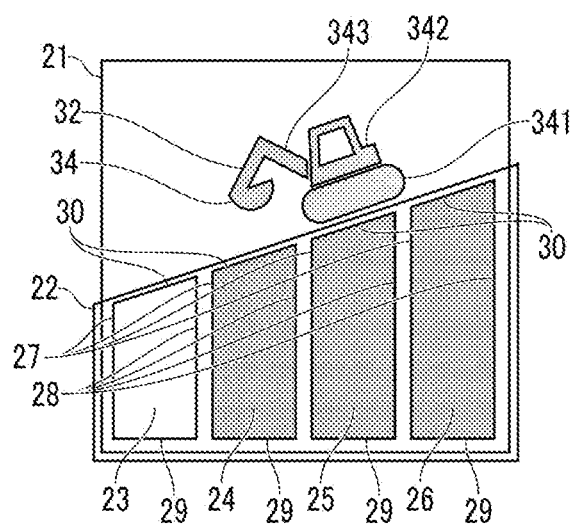
FIG. 3 illustrates a first image and a second image which are displayed on a communication device of FIG. 1.

FIG. 3 illustrates the fourth image 34 disposed adjacently on the upper side of the first image 22. The fourth image 34 is representation showing that the first radio wave intensity is less than the second radio wave intensity. The fourth image 34 is displayed when the display state is changed from the display of the first image element 23 to the third image element 25 to the display of only the first image element 23, for example. The display of the fourth image 34 means that the radio wave intensity is changed to become weaker, and therefore, the operator can recognize that the communication failure such as communication cutoff may occur.

The fourth image 34 illustrated in FIG. 3 is a schematic diagram illustrating a state where a power shovel is going down a hill. The fourth image 34 includes a drive part 341 including a crawler, a boarding part 342 disposed on the drive part 341, and an attachment part 343 of the power shovel or the like which is disposed in front of the boarding part 342, and is formed with the front side directed obliquely downward so that the power shovel is going down a downhill.

Note that, the fourth image 34 may be of any shape. For example, the fourth image 34 may be represented with any geometric figure such as a downward triangle, a downward or obliquely downward or leftward arrow, a circle, and a square to be distinguished from the third image 33. The fourth image 34 may be formed by any of a specific color, a pattern, and both of them. The fourth image 34 may be represented in a noticeable color such as red or yellow so that the operator can recognize easily. Furthermore, the fourth image 34 may be displayed by blinking alone, together with a part of the first image, or together with the whole of the first image.

In the above example, a case has been described where the second image 32 includes the third image 33 and the fourth image 34, but the second image 32 may be configured to include only the fourth image 34 without including the third image 33. That is, the second image 32 representing the information on a change in the radio wave intensity received by the work machine may be only the fourth image 34 representing that the first radio wave intensity is less than the second radio wave intensity. In this case, the display can be simplified, thereby improving the visibility of the operator.

Figure 4:
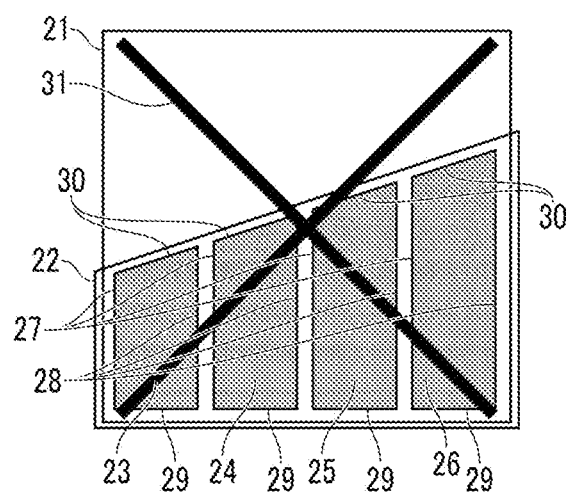
FIG. 4 illustrates a first image which is displayed on the communication device of FIG. 1.

Next, with reference to FIG. 4, description will be made about a state where the radio wave intensity is less than a predetermined value, i.e., a radio wave non-detected state where no radio wave is detected and no radio wave is received. FIG. 4 illustrates a fifth image element 31 formed in an X shape in which straight lines cross each other, the fifth image element 31 being superposed on the first image 22. The state where the radio wave intensity is less than the predetermined value means a state where the radio wave cannot be normally transmitted and received since some problem occurs in the remote operation device 10 side or the transmission and reception device 80 on the work machine side when the radio wave intensity received by the transmission and reception device 80 of the work machine is less than a predetermined minimum reception intensity. In the radio wave non-detected state, the first image element 23 to the fourth image element 26, the third image 33, and the fourth image 34 are not displayed. Note that the shape of the fifth image element 31 to be displayed is not limited thereto. Alternatively, the X shape may be displayed without being superposed on the first image 22.

Next, description will be made about the fifth image in which the radio wave intensity is displayed in association with corresponding positional information. The communication device 14 includes a position specification unit 51 configured to specify a position of the work machine, and a storage unit 61 configured to store the position of the work machine specified by the position specification unit 51 and the information on the radio wave intensity at the position in association with each other. On the other hand, the transmission and reception device 80 mounted on the work machine includes a position detecting unit 81. The positional information of the work machine is detected by the position detecting unit 81, and is transmitted by the transmission and reception device 80.

The transmitted positional information of the work machine is received by the communication device 14, and is sent to the position specification unit 51 to specify the position of the work machine. Then, the positional information of the work machine and the information on the radio wave intensity at the position are stored in association with each other in the storage unit 61. A plurality of sets of the positional information and the information on the radio wave intensity at the position are stored in the storage unit 61 as both histories including the current time point.

Figure 5:
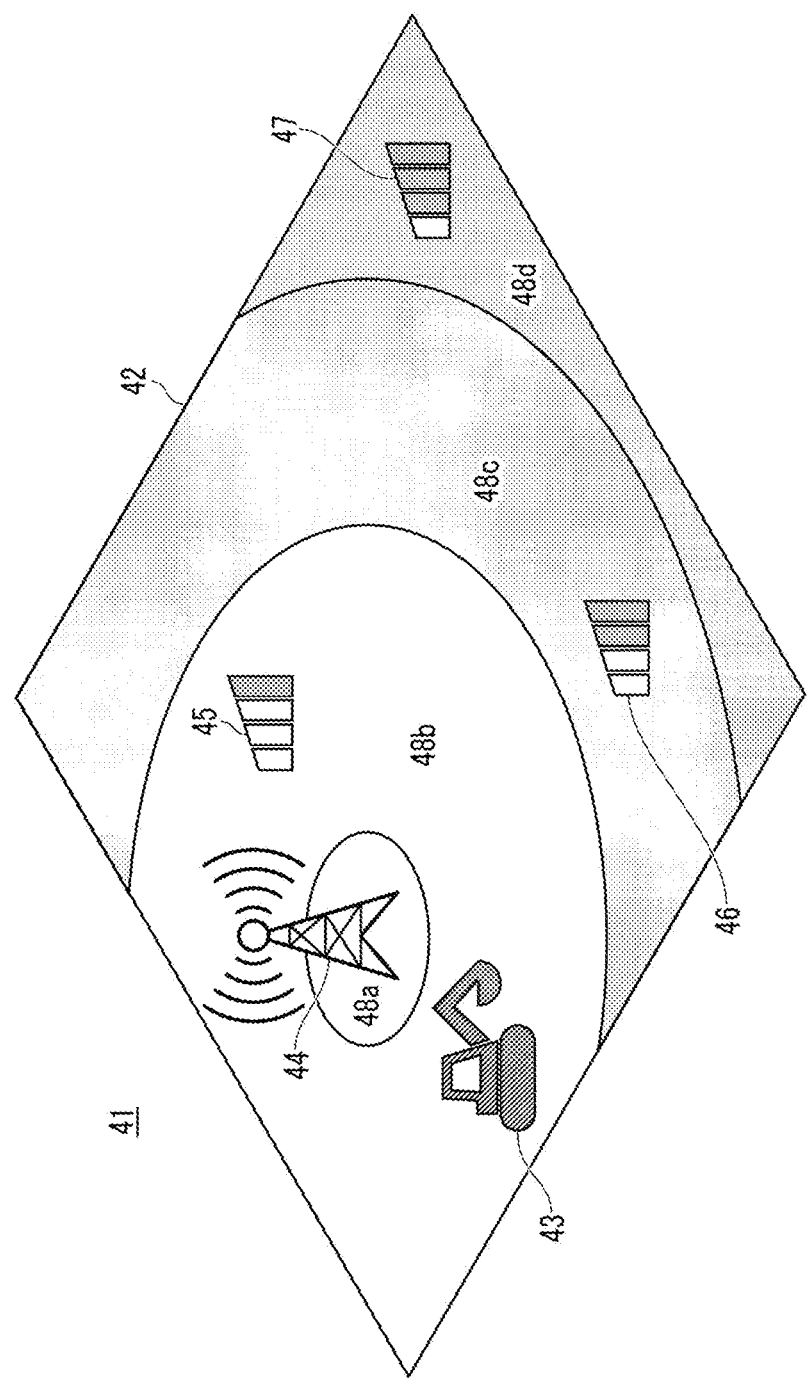
FIG. 5 illustrates a fifth image which is displayed on the communication device of FIG. 1.

With reference to FIG. 5, the above example will be further described. FIG. 5 illustrates a fifth image 41. In the fifth image 41, a position of a sixth image element 43 in a region 42 is a current location of the vehicle, i.e., the work machine. A map showing the region 42 is displayed based on the position of the work machine. The region 42 to be displayed is the map around the work machine which includes terrain data, and is stored as map data in the storage unit 61 of the communication device 14. A range of the map region to be displayed is initially set. When the movement distance of the work machine is small, a narrow region range on the map is displayed on the display unit 21. Additionally, in the vehicle such as a passenger vehicle whose movement distance is long or movement range is wide, a wide region range on the map is displayed on the display unit 21.

A seventh image element 44 being displayed in the region 42 is an antenna configured to transmit and receive the radio wave by communicating with the work machine. The antenna is a base station configured to relay communication between the remote operation device 10 and the transmission and reception device 80, and communicate with the remote operation device 10 wiredly or wirelessly. The radio wave intensity A45 to the radio wave intensity C47 are radio wave intensities at points A to C where the work machine has traveled up to the current time. Since the point A is near the antenna, the display of the radio wave intensity at the point A is represented by three elements of the first image element 23 to the third image element 25 in the first image 22. Additionally, since the point C is far from the antenna, the radio wave intensity at the point C is represented by one element of only the first image element 23 in the first image 22. Furthermore, since the distance between the point B and the antenna is present between the point A and the point C, the radio wave intensity at the point B is represented by two elements of the first image element 23 to the second image element 24 in the first image 22.

In this way, the radio wave intensity at the location where the work machine has traveled is displayed at the corresponding position in the region 42 of the fifth image 41. Accordingly, the operator can easily recognize the radio wave intensity for each location in the region 42 collectively, and can plan to cause the work machine to travel while avoiding the location where a likelihood of the communication cutoff is predicted.

Note that a range of the display region to be displayed on the display unit 21 can be changed to a preferable range. Furthermore, the region range to be displayed can be automatically changed to be substantially the same as the region of the movement range according to the length of the movement distance of the vehicle and the size of the movement range. For example, when the movement range of the vehicle is narrower than the set display range, the region range on the map to be displayed is set to be small and is displayed on the display unit 21, so that only the region of the movement range can be displayed.

On the other hand, when the movement range of the vehicle is wider than the set display range, the region range on the map to be displayed is set to be large and is displayed on the display unit 21, so that the whole region of the movement range can be displayed. Thus, the whole movement range of the vehicle is automatically displayed to be just fitted in the display unit 21, which allows the radio wave intensity at the location where the vehicle is traveling to be displayed in an easy-to-see manner.

The points in the region 42 of the fifth image where the radio wave intensity is displayed can be selected. For example, only the points where the radio wave intensity is strong can be displayed by three or more elements or only four or more elements of the first image element 23 to the fourth image element 26 in the first image. Additionally, only the points where the radio wave intensity is weak can be displayed by up to two elements of the first image element 23 to the second image element 24 or only one element of only the first image element 23 in the first image.

The region 42 of the fifth image can be displayed by dividing the map into a plurality of color regions according to the radio wave intensity. For example, the region 48a to the region 48d can be separately colored with reference to each radio wave intensity at the points A to C and the antenna position. The region 48a is a region in which the first image element 23 to the fourth image element 26 may be switched to be displayed, the region 48b is a region in which the first image element 23 to the third image element 25 may be switched to be displayed, the region 48c is a region in which the first image element 23 and the second image element 24 may be switched to be displayed, and the region 48d is a region in which only the first image element 23 may be switched to be displayed. The region 48a to the region 48d are displayed by changing colors, gradations and the like to be distinguished from each other. The number of points where the radio wave intensity is to be measured may be increased for separate coloring, to improve the coloring accuracy.

The present invention makes it possible to notify the operator of the change in the radio wave intensity in addition to the radio wave intensity of the radio wave received by the vehicle remotely operated by the operator.

In the communication device according to the present invention, it is preferable that the information on the change in the first radio wave intensity indicates a change in the first radio wave intensity with respect to the second radio wave intensity which is the radio wave intensity at the time point that is the predetermined time before from the current time point, and the second image includes the third image showing that the first radio wave intensity is equal to or greater than the second radio wave intensity and the fourth image showing that the first radio wave intensity is less than the second radio wave intensity.

The communication device according to the present invention can notify the operator whether the radio wave intensity received by the vehicle remotely operated by the operator becomes stronger or weaker, based on the second image including the third image and the fourth image. In particular, the operator remotely operating the vehicle needs to concentrate in remote operation work. In such situations, however, the operator can easily recognize the change in the radio wave intensity at a glance of the second image.

The communication device according to the present invention includes the position specification unit configured to specify a position of the vehicle, and the storage unit configured to store the information including histories of one or more radio wave intensities received by the vehicle in association with the positional information of the respective radio wave intensities, and it is preferable that the display unit can display the fifth image that displays the radio wave intensities included in the histories in association with the corresponding positional information.

According to the communication device according to the present invention, the operator can know, as needed, the radio wave intensity at a specific location in the work area where the remotely operating vehicle is working. Accordingly, the operator can select the work place having a good communication state and work at the selected work place, and can work on the presumption that the communication state is bad.

In the communication device according to the present invention, it is preferable that the fifth image is displayed on the map showing the region in which the vehicle travels.

According to the communication device according to the present invention, the radio wave intensity at the location where the vehicle has traveled in the vehicle traveling region is displayed to be superposed on the map showing the vehicle traveling region, whereby the operator can easily recognize the radio wave condition in the vehicle traveling region.

REFERENCE SIGNS LIST

14 Communication device
21 Display unit
22 First image
32 Second image
33 Third image
34 Fourth image
51 Position specification unit
61 Storage unit
41 Fifth image
42 Region

What is claimed is:

1. A communication device which transmits and receives a radio wave to and from a vehicle to remotely operate the vehicle, the communication device comprising:
   a display unit configured to display information,
   wherein the display unit is capable of displaying a plurality of images,
   the plurality of images include:
      a first image representing first radio wave intensity which is radio wave intensity of a radio wave being currently received by the vehicle, and
      a second image representing information on a current change in the first radio wave intensity, and
   the information on the current change in the first radio wave intensity indicates a change status of the first radio wave intensity with respect to second radio wave intensity which is radio wave intensity at a time point that is a predetermined time before from a current time point,
   wherein the display unit is capable of simultaneously displaying the first image and the second image with each image of the first image and the second image being displayed in respective portions of the display unit,
   the first image includes a plurality of vertically elongated rectangle elements with respective vertical edges thereof arranged adjacent to each other, with each rectangle element thereof having a larger height from a preceding rectangular element such that top portions of the plurality of vertically elongated rectangular elements form a slope relative to base portions of the plurality of vertically elongated rectangular elements, and
   the second image is an iconographic depiction of a work machine disposed along the slope formed by the top portions of the plurality of vertically elongated rectangular elements.

2. The communication device according to claim 1, wherein
   the display unit displays the work machine of the second image ascending the slope when the first radio wave intensity is equal to or greater than the second radio wave intensity, and displays the work machine of the second image descending the slope when the first radio wave intensity is less than the second radio wave intensity.

3. The communication device according to claim 1, wherein the communication device is further configured to:
   specify a position of the vehicle; and
   store information including histories of one or more radio wave intensities of radio waves received by the vehicle in association with reception positional information of the respective radio wave intensities, and
   wherein the plurality of images includes a fifth image that displays the one or more radio wave intensities included in the histories in association with the corresponding positional information.

4. The communication device according to claim 2, wherein the communication device is further configured to:
 specify a position of the vehicle; and
 store information including histories of one or more radio wave intensities of radio waves received by the vehicle in association with reception positional information of the respective radio wave intensities,
 wherein the plurality of images includes display unit is capable of displaying a fifth image that displays the one or more radio wave intensities included in the histories in association with the corresponding positional information.

5. The communication device according to claim 3, wherein
 the fifth image is displayed on a map showing a region in which the vehicle travels.

6. The communication device according to claim 4, wherein
 the fifth image is displayed on a map showing a region in which the vehicle travels.

\* \* \* \* \*